(12) United States Patent
Dai

(10) Patent No.: US 10,541,774 B1
(45) Date of Patent: Jan. 21, 2020

(54) COEXISTENCE COMMUNICATION INFRASTRUCTURE FOR DENSE WAVELENGTH DIVISION MULTIPLEXING AND PASSIVE OPTICAL NETWORKS

(71) Applicant: Cox Communications, Inc., Atlanta, GA (US)

(72) Inventor: Yuxin Dai, Santa Rosa, CA (US)

(73) Assignee: COX COMMUNICATIONS, INC., Atlanta, GA (US)

(*) Notice: Subject to any disclaimer, the term of this patent is extended or adjusted under 35 U.S.C. 154(b) by 0 days.

(21) Appl. No.: 15/707,956

(22) Filed: Sep. 18, 2017

(51) Int. Cl.
*H04J 14/02* (2006.01)
*H04B 10/27* (2013.01)

(52) U.S. Cl.
CPC ...... *H04J 14/0234* (2013.01); *H04J 14/0291* (2013.01); *H04B 10/27* (2013.01)

(58) Field of Classification Search
None
See application file for complete search history.

(56) References Cited

U.S. PATENT DOCUMENTS

| 2006/0104638 | A1* | 5/2006 | Chung | H04J 14/0226 398/71 |
| 2010/0054740 | A1* | 3/2010 | Lee | H04J 14/0226 398/68 |
| 2012/0045205 | A1* | 2/2012 | Perron | H04B 10/0795 398/48 |
| 2013/0039656 | A1* | 2/2013 | Lam | H04J 14/0282 398/47 |
| 2014/0355987 | A1* | 12/2014 | Zhu | H04B 10/2537 398/58 |
| 2015/0349912 | A1* | 12/2015 | Komi | H04J 14/025 398/34 |
| 2016/0134364 | A1* | 5/2016 | Grobe | H04B 10/071 398/25 |

OTHER PUBLICATIONS

J Hasegawa and K Nara, "Development of Wide Operating Temperature Range (−30 to 70/C) Athermal AWG Module with high Reliability", Furukawa Review, No. 30 2006.

* cited by examiner

*Primary Examiner* — David W Lambert
(74) *Attorney, Agent, or Firm* — Merchant & Gould

(57) ABSTRACT

Aspects of the present disclosure provide a technical solution that enables various passive optical network (PON) type infrastructures to coexist with dense wavelength division multiplexing (DWDM) network infrastructures. According to an embodiment, an optical communication network framework uses an optical coexistence topology to enable coexistence of PON type components and DWDM components. An optical coexistence system uses an optical coexistor to convey an upstream optical signal to one of an arrayed wave grating (AWG) of a DWDM system and an optical line terminal (OLT) of a PON by conveying unfiltered portions of the upstream optical signal to the OLT and filtered portions of the upstream optical signal to the AWG.

20 Claims, 6 Drawing Sheets

COEXISTENCE COMMUNICATION INFRASTRUCTURE FOR DENSE WAVELENGTH DIVISION MULTIPLEXING AND PASSIVE OPTICAL NETWORKS

BACKGROUND

Optical fiber communication network deployments utilize an optical distribution network (ODN) to convey optical signals. As part of a deep fiber optic architecture, remote physical (RPHY) deployment positions use radio frequency (RF) modulation devices deep in the field. RPHY can be attached to coaxial outside plant, while keeping media access control (MAC) and higher layer devices in the center or other location within the network (e.g., at the headend, data center, etc.). RPHY architectures help in improving the efficiency of the network by moving the RF modulation devices closer to customer locations where higher order modulations such as 2K, 4K, etc., quadrature amplitude modulation (QAM) can be implemented. DOCSIS MAC can be physically located at the headend or in datacenter servers where Gigabit to 10G Ethernet interfaces can be deployed between RPHY and the DOCSIS MAC.

However, there are challenges for RPHY architectures. One associated technical challenge involves synchronizing RPHY devices and MAC. Another technical challenge involves the backhaul of large amounts of high-speed Ethernet traffic associated with a backhaul network for RPHY devices since the communication protocol between RPHY and MAC is Ethernet at a rate of multiple Gigabits per second (Gbps).

Another anticipated deployment is the introduction of fifth generation (5G) wireless network services. As part of providing wireless network services, multi-service operators (MSOs) can be contracted by wireless carriers to provide wireless backhaul and/or fronthaul services. The amount of data to backhaul and/or fronthaul for 5G wireless network services is estimated to significantly increase, which poses an additional technical challenge to metro and access networks. RPHY and 5G wireless backhauls and/or fronthauls pose a significant technical challenge to an MSO network design. To design a unified and converged access network to backhaul RPHY and backhaul/fronthaul 5G wireless traffic and at the same time align with an MSO's long term migration direction to passive all-fiber access networks adds further to the technical challenge.

As will be appreciated, there are a number of technical architectural challenges associated with the design of a common DWDM (Dense Wavelength Division Multiplexing) system optimized for RPHY backhaul and 5G or higher iteration mobile wireless fronthaul. For example, one challenge is the coexistence with a variety of passive optical networks (PONs), such as, for example, Gigabit PON (GPON), XGS-PON, Next-Generation PON 2 (NG-PON2), 10G Ethernet PON (10G EPON), 25G PON, etc. on a common ODN. Another challenge is to maintain a passive DWDM infrastructure with at least 20 km fiber reach while compensating for losses from DWDM filters, optical protection switches, coexist filters, etc.

SUMMARY

Aspects of the present disclosure provide a technical solution that enables various passive optical network (PON) type infrastructures to coexist with dense wavelength division multiplexing (DWDM) network infrastructures. According to an embodiment, an optical communication network framework uses an optical coexistence topology to enable coexistence of PON type components and DWDM components. An optical coexistence system uses an optical coexistor to convey an upstream optical signal to one of an arrayed wave grating (AWG) of a DWDM system and an optical line terminal (OLT) of a PON by conveying unfiltered portions of the upstream optical signal to the OLT and filtered portions of the upstream optical signal to the AWG.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

As described in detail below, the present disclosure describes a novel communication framework that enables a variety of passive optical network (PON) architectures to coexist with dense wavelength division multiplexing (DWDM) networks. The novel communication framework enables optical communications by employing an optical coexistence topology to enable coexistence of a variety of PON type components with DWDM components.

Generally, a multi-service operator (MSO) access network architecture may include hybrid fiber coax (HFC) components, active optical Ethernet (AON) components, and/or passive optical network (PONs) components. Legacy HFC, although under constant upgrade, is mainly providing DOCSIS protocol (D3.0, D3.1, etc.) based cable data, voice, and/or video services. Point-to-Point (P2P) AON is occasionally used as part of a communication network for business customers.

A PON (e.g., GPON (2.5G), XGS-PON (10G), 10G EPON, etc.) is used as part of a communication network to provide high-speed communication services including Gigabit services to both residential and business customers. While deployment of PON continues to increase in MSO networks, the deployment of AON tends to be more limited.

From an outside plant (OSP) point of view, an HFC has point-to-point (P2P) fiber from a cable headend 112 to a node in the field, and point-to-multiple-point (P2MP) coax cables from the node to the end-users. AON typically uses P2P fiber from a headend 112 to an end-user. A PON ODN typically uses a P2MP fiber topology from a headend 112 to end-users.

An exemplary PON may include a fiber-to-the-home (FTTH) architecture that includes a P2MP ODN in which passive optical splitters are used to enable a single optical fiber to serve multiple homes. A PON may include one or more optical line terminals (OLTs) at a service provider central office (CO) and/or other locations and one or more optical network terminals (ONTs) or optical network units (ONUs) at the customer premises and/or other locations. PON standards today include EPON, GPON, XGS-PON, 10G EPON, and NG-PON2.

Common Public Radio Interface (CPRI) (also referred to as Radio over Fiber (RoF)) is used in various deployments for wireless fronthaul communications by wireless carriers. The network for wireless backhaul and fronthaul architecture is referred to as Centralized Radio Access Network (C-RAN). Fronthaul fiber segments couple wireless Baseband Unit (BBU) 114 to Remote Radio Heads (RRHs) 108 or other terminals. The fiber distance of a fronthaul segment is normally less than about 20 km. The fiber distance varies in the backhaul fiber segment from BBU 114 to the packet core network. The BBU 114 is typically located at the wireless data center or central office. It is anticipated that fifth generation (5G) wireless services will result in a significant increase in demand of optical fiber infrastructure including DWDM wavelengths for fronthaul CPRI traffic or other fronthaul traffic.

Figure 1:
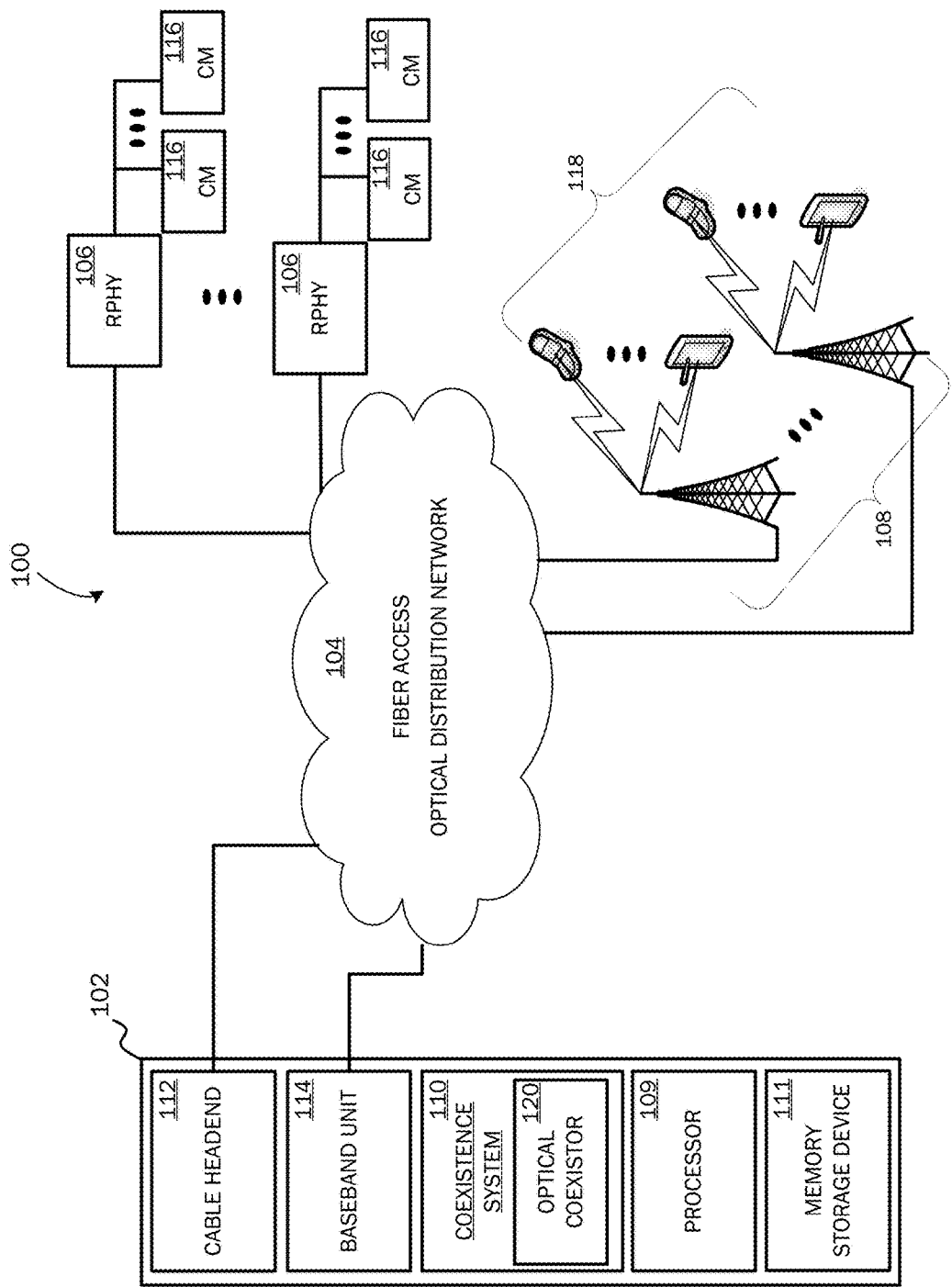
FIG. 1 is a block diagram of a coexistence communication architecture that enables PON type components to coexist with DWDM components.

FIG. 1 is a block diagram that, at a high level, depicts a coexistence communication architecture 100 (architecture 100) that enables PON type components to coexist with DWDM components, but is not so limited. As described more fully below, the architecture 100 unifies fiber access networks utilizing DWDM and/or PON technologies to support both RPHY backhaul and 5G or other wireless fronthaul. A common passive DWDM architecture for both RPHY and 5G wireless fronthaul provides benefits to an MSO or other entity due in part to large available volume in wireless backhaul/fronthaul for various locales.

As shown in FIG. 1, architecture 100 includes central office (CO) or datacenter infrastructure/equipment 102 that communicates over a fiber access optical distribution network (ODN) 104 with a plurality of remote physical (RPHY) devices (collectively referred to by reference number 106), RRHs (collectively referred to by reference number 108), and/or other communication components. According to one implementation, the infrastructure 102 includes at least one processor 109, a coexistence system 110, memory storage device 111, a cable headend 112, and a BBU 114, but is not so limited. While shown as unified architecture, it will be appreciated that architecture 100 can include additional components and the various depicted components can be located at different locations and/or distributed across architecture 100.

The memory storage device 111 includes one or more computer-readable storage media. Computer-readable storage media are articles of manufacture operable to store data or computer-executable instructions. The term computer-readable storage media does not include transmission media over which signals are propagated. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

As described further below, coexistence system 110 provides a mechanism that enables DWDM type infrastructure to coexist with PON type infrastructure. RPHY devices 106 are coupled with cable modems (CMs) (collectively referred to by reference number 116) and/or other infrastructure. RRHs 108 receive wireless signals from handheld devices (collectively referred to by reference number 118) and convert and transmit signals to BBU 114 via ODN 104. The processor 109 can be configured to manage various functions including, but not limited to, functions of RPHY devices, RRH devices, data link layers, network layers, transport layers, etc. It will be appreciated that the similarities of network topologies for RPHY backhaul and 5G wireless C-RAN fronthaul can be leveraged to provide a coexistence solution.

Exemplary similarities include:

1) The fronthaul distance from wireless BBU to RRH is less than about 20 km and statistical data shows that about 80% of RPHY devices are within about 20 km distance from a cable headend;

2) DOCSIS RPHY nodes and 5G small cell RRHs are located closer to end-users as compared to previous generations;

The 5G fronthaul network and RPHY backhaul network are in the same geography regions in many cases;

3) RPHY backhaul and 5G wireless fronthaul networks can be built with P2P fiber, passive DWDM, active DWDM, and/or high-speed PON;

4) Both RPHY backhaul and wireless fronthaul need high-speed data transport networks, for example 10 Gbps, 25 Gbps, 40 Gbps, or higher rates.

With continuing reference to the architecture 100 of FIG. 1, the coexistence system 110 includes an optical coexistor 120 that enables PON infrastructure to coexist with dense wavelength division multiplexing (DWDM) fronthaul/backhaul networks. Coexistence system 110 can include coexistence components that may be located and/or distributed in various physical locations throughout the architecture 100. In one embodiment, described below in conjunction with FIG. 2, the optical coexistor 120 of coexistence system 110 includes a bandpass filtering component (bandpass filter 202) located at or near the infrastructure 102 location. In another embodiment, described below in conjunction with FIG. 4, the optical coexistor 120 of coexistence system 110 includes an optical splitting component (optical splitter 402) and a blocking filtering component (blocking filter 404) located at or near the infrastructure 102 location. It will be appreciated that the optical coexistor 120 can be integrated with other optical conveyance components or as a stand-alone component(s). The coexistence system 110 enables PON communication components to coexist with DWDM fronthaul/backhaul networks when managing fronthaul communications associated with RRHs 108 (e.g., 5G wireless) as well as managing backhaul communications associated with RPHY devices 106.

Figure 2:
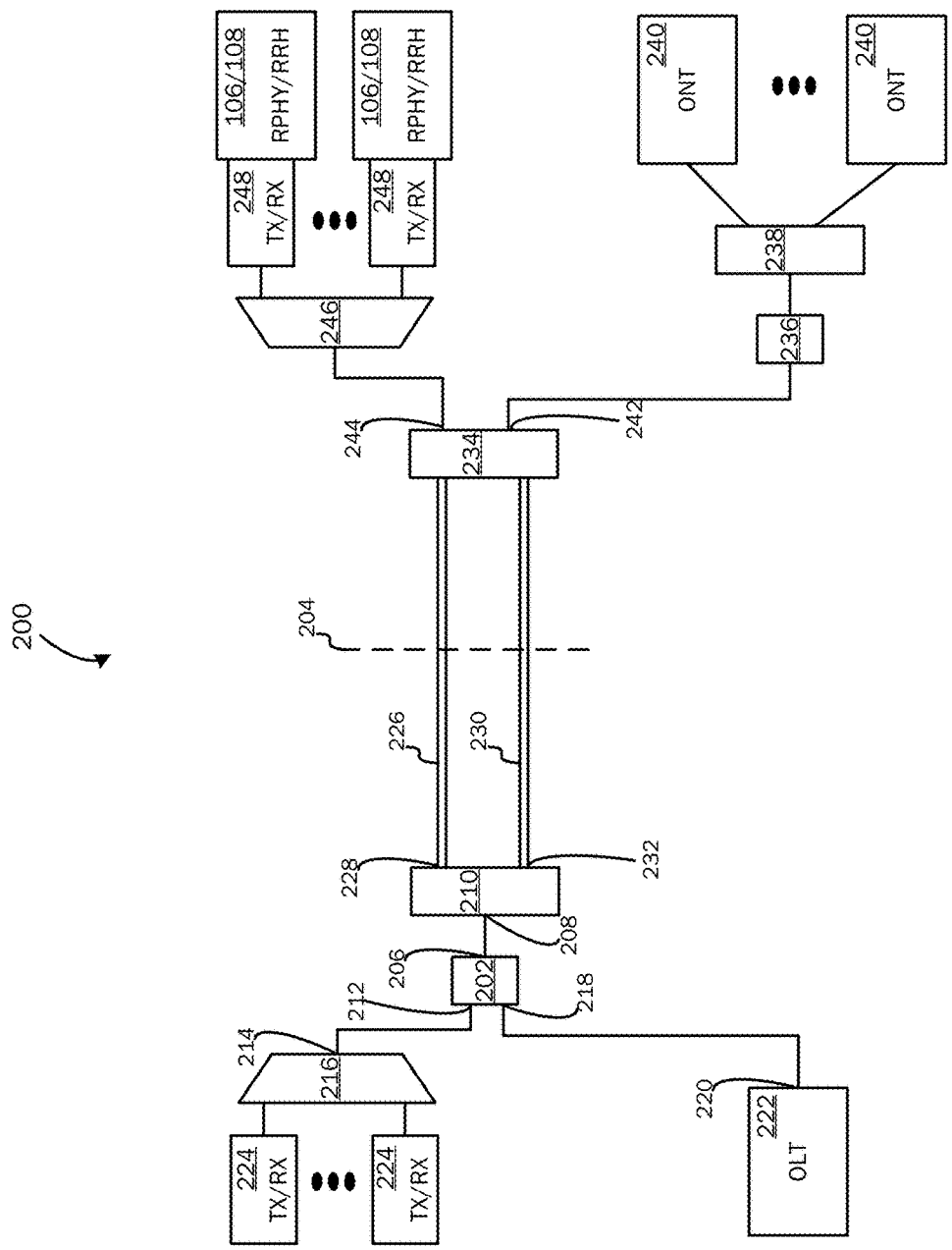
FIG. 2 is a block diagram of a system that enables PON communication infrastructure to coexist with a DWDM communication infrastructure.

FIG. 2 is a block diagram of a system 200 that enables a variety of PON type communication infrastructures to coexist or be unified with a DWDM communication infrastructure, but is not so limited. As described below, the system 200 enables the use of PON communication components and DWDM communication components when managing fronthaul or other communications associated with a cellular network's RRH devices 108 (e.g., 5G communications) as well as managing backhaul or other communications associated with a plurality of RPHY devices 106 or other components, but is not so limited.

Due in part to the integrated passive optical components, the unified system 200 provides a flexible channel plan which requires less required maintenance and lower associated costs. In one aspect, the system 200 requires no optical amplifications. For example, the system 200 can omit expensive Semiconductor Optical Amplifiers (SOAs) or Erbium-doped Fiber Amplifiers (EDFAs) which impose inflexible channel plans since "red-blue" filters are needed for bidirectional EDFA (e.g., excludes interleave channel plans). Since system 200 can remove EDFAs, no guard band is needed for "red-blue" filtering and the full C band frequency spectrum can be used if needed.

System 200 can support 50 C band channels with 100 GHz channel spacing and at least 20 km reach. System 200 requires no optical amplification to meet the anticipated 5G wireless fronthaul reach and/or about 80% of the RPHY backhaul reach. System 200 also provides 1:1 fiber protection on the trunk fiber. For example, for a 32 channel system, the DWDM trunk supports 32 RPHY with 4096 end-users assuming that each RPHY has 128 end-users. The 1:1 fiber protection provided by system 200 enables failover and/or protective safeguards for RPHY backhaul and the wireless fronthaul. System 200 automatically provides a failover mechanism by switching to a functional fiber trunk line from a non-functional fiber trunk line to prevent communication loss in the system 200 which could detrimentally affect adjacent wireless cells and potentially other communication components. System 200 provides a standards-based solution that aligns with the migration to PON since system 200 supports overlay with various PON types including coexistence with GPON, XGS-PON, NG-PON2, 10G EPON, 25 Gbps/100 Gbps EPON, etc.

As shown in FIG. 2, system 200 enables DWDM and PON topology coexistence at the headend or OLT side by employing an optical bandpass filter 202 ("bandpass filter 202") between AWG 216 and optical switch 210 and between optical line terminal (OLT) 222 and optical switch 210. Bandpass filter 202 of system 200 can be used as a mechanism to enable any type of PON system to coexist with DWDM. Deployment of bandpass filter 202 removes the need for a traditional coexistance filter (PON upstream wavelength blocking filter) before OLT 222 along with the unsatisfactory optical communication characteristics associated with the traditional coexist filter before OLT 222 (e.g., imposes additional insertion loss to PON signals and DWDM signals).

The bandpass filter 202 provides a technical solution for coexistence of DWDM infrastructure with PON infrastructure (e.g., GPON, XGS-PON, NG-PON2, 10G EPON, 25 Gbps/100 Gbps EPON, etc.). Traditional PON coexistence filters are limited to support coexistence of only two PON types or one type of PON with a DWDM system. For the depicted implementation and for ease of description, components located to the left of demarcation line 204 are referred as headend, central office, and/or datacenter components while components located to the right of demarcation line 204 are referred to as field components. Optical signals that flow to the left side of 204 are referred to as upstream signals and optical signals that flow to the right side of 204 are referred to as downstream signals.

According to the embodiment of FIG. 2, the bandpass filter 202 has three ports (also referred to interchangeably as couplings, connections, connectors, interfaces, terminals, etc.). Port 206 (common port) of bandpass filter 202 is coupled with port 208 of optical switch 210. Port 212 (C and/or L passband port) of bandpass filter 202 is coupled to port 214 of arrayed wave guide or grating (AWG) 216 and port 218 (reflecting port) of bandpass filter 202 is coupled to port 220 of optical line terminal (OLT) 222. Bandpass filter 202 enables signals destined for PON components to coexist with signals destined for DWDM components.

OLT 222 is traditionally located at the headend of a PON and is used to process and/or route signals from a service provider network or other system to/from subscribers. The signals received from or transmitted to a service provider may be optical, electrical, or radio signals carried over the appropriate transmission medium. The services may include internet, television, telephone services, etc. A service provider may have any number of OLTs 222 to provide services to a large base of clients.

AWGs 216 can be used for DWDM optical signal multiplexing (MUX) and de-multiplexing (DMUX) operations. Use of AWG components can reduce insertion loss caused by DWDM thin film filters. AWGs 216 can be designed to have constant insertion loss independent of channel counts. An AWG 216 tends to have lower loss for large channel counts, more uniform loss between channels, and cyclic prosperity. For example, assuming a 40 channel DWDM system, compared with a thin film filter, Gaussian AWG can save at least 6 dB in link budget for a pair of MUX/DMUX (link budget saving from the new coexistence architecture is about 3 dB, combined with the insertion loss saving from using Gaussian AWG, the total link budget saving is about 9 dB).

In one embodiment, AWG 216 is configured as an athermal AWG (AAWG) to provide temperature stability by using a material having a different thermal expansion coefficient than that of silica to compensate for the reflection index change of silica caused by temperature variations. The 1 dB pass band of Gaussian AAWG is ≥0.2 dB. In comparison, the 1 dB pass band of a flat top AAWG is ≥0.38 dB and the 0.5 dB pass band for the thin film filter is ≥0.22 dB. In order to use low loss Gaussian type AAWG, the laser transmitter should include narrow wavelength variations.

For example, for an AAWG implementation, system 200 can employ 10G small form-factor pluggable (SFP)+Electro-absorption Modulated Laser (EML) transceivers to enable a passive DWDM system that supports at least 20 km reach with the possibility to extend to 40 km reach within reasonable margins. The EML has more wavelength stability than a direct modulated laser (DML). Take 10G EML SFP+ for example, the wavelength accuracy is EOL: 0.1 nm/BOL: ±0.04 nm, where BOL and EOL represent the "beginning of life" and "end of life" respectively. The EOL of wavelength drift of the 10G SFP+ is within the 1 dB pass band of the AAWG. EML with its favorable dispersion characteristics is also well-suited for the >20 km reach of 10G systems to mitigate a dispersion penalty. Gaussian AAWGs and EML transmitters enable a low insertion loss DWDM system and can be implemented as part of the operational infrastructure of system 200.

Transceivers 224, 248 can be integrated into a single hardware package or distinct transmitters and receivers can be deployed. By using separate hardware for receivers and for transmitters, a service provider can set different target speed increases for downstream communications (i.e., transmission from service provider to subscriber), upstream communications (i.e., transmission from subscriber to service provider), and have granular control over the wavelengths of carrier waves.

System 200 uses the optical switch 210 to provide protection of trunk fiber by providing an optical working path 226 via port 228 and an optical protection path 230 via port 232. Protection ports 228 and 232 of the optical switch 210 are connected to the working fiber of working path 226 and protecting fiber of protection path 230 such that, if the working fiber is cut or otherwise compromised, port 228 is configured to sense upstream loss of signal (LOS) and trigger switching to port 232 to switch communications to the protecting fiber. It will be appreciated that system 200 can include additional optical and/or electrical components (e.g., media access control (MAC), etc.) including additional bandpass filters positioned between additional AWGs and OLTs at the headend.

Depending on the required optical filtering characteristics of system 200, bandpass filter 202 can be configured to pass a certain spectrum of frequencies to the AWG 216. According to an embodiment, bandpass filter 202 includes a C band frequency passband to filter an optical signal coming from in the field components in the upstream direction consisting of all or some portion of the wavelengths from the O band to the L band. The passband and configuration of the bandpass filter 202 of one embodiment allows C band and/or L band frequency optical signals to pass to port 212 that is coupled to port 214 of AWG 216. Thus, desired upstream frequencies of DWDM channels can be passed from bandpass filter 202 to AWG 216. The remaining portions of upstream optical signals absent of C band frequencies (or other filtered frequencies) that consist of PON upstream and downstream signals are reflected to port 218 of the bandpass filter 202 that is coupled with OLT 222. Using the bandpass filter 202 to pass C band frequency and/or L band frequency optical signals and reflect other frequencies, enables DWDM communication topologies to coexist with PON communication topologies (e.g., GPON, EPON, XGS-PON, EPON, 10G EPON, etc.).

A low loss DWDM AWG may utilize wavelengths and associated frequencies in different optical signal bands, such as C band, L band, and/or potentially other wavelengths (e.g., S band). For example, DWDM channel topologies have been proposed that extend from 1519 nm to 1577 nm. PON topologies, with the exception of NG-PON2, do not use C band frequencies for upstream communications (e.g., GPON uses 1310 nm/1490 nm, XGS-PON uses 1270 nm/1578 nm, and 10G EPON uses 1270 nm/1577 nm for upstream/downstream communications respectively). However, NG-PON2 uses a portion of C band wavelengths for upstream communications since the four TWDM channels in NG-PON2 are located at the upper L band to upper C band. If the DWDM wavelength plan avoids the frequencies used by NG-PON2, then the DWDM system can coexist with each PON type. According to one embodiment, the bandpass filter 202 passband can be configured to exclude the part of the C band and/or L band (or some portion thereof) used by NG-PON2 topologies to enable coexistence of NG-PON2 with DWDM.

According to an embodiment, coexistence of DWDM and PON communication topologies in the field or to the right of demarcation line 204 is achieved in conjunction with the protection of the trunk fiber via ports 242 and 244 of a 2×2 optical coupler 234. Optical coupler 234 is coupled with an optical blocking filter 236 that is coupled with a 1×N (N=16, 32, etc.) passive optical splitter 238. Passive optical splitter 238 is coupled with optical network units/terminals (ONUs/ONTs) (collectively referred to by reference number 240).

ONTs 240 can be deployed at or near a subscriber location to receive services from the service provider or other entity and to transmit communications back to the service provider or other entity. For example, an ONT 240 may be deployed to a utility pole, cable box, or exterior wall of a home or business location. In another example, an ONT 240 may be deployed interior to a subscriber's premises, where the ONT 240 acts as a connection point between the PON and a subscriber network, which may be electrical (e.g., coaxial copper wiring, Ethernet), optical (e.g. POF (plastic optical fiber), or radio (e.g., Wi-Fi, Bluetooth)). OLT 222 may receive a downstream communication from a service provider via a fiber optic receiver for example, or ONT 240 may receive an upstream communication from a subscriber over an Ethernet receiver for example.

Port 244 of optical coupler 234 is coupled with AWG 246 in the field. AWG 246 is coupled with a plurality of transceivers (collectively referred to by reference number 248). Optical coupler 234 provides trunk fiber protection as well as supporting the coexistence of DWDM and PON communication infrastructures. Ports 242 and 244 of optical coupler 234 forward downstream signals to the ONUs/ONTs 240 and AWG 246, respectively. The optical configuration of AWG 246 serves to naturally reject optical signals conveyed from PON OLTs 222 that are not within the AWG's operational frequency range. That is, as described above, each AWG is configured to operate within a particular frequency spectrum. There is no additional loss for the DWDM topology, which saves about 1.5 dB in optical link budget in comparison with traditional coexistence filter method. DWDM C-band and/or L-band signals (or some portion thereof) are blocked by blocking or stopband filter 236 located before the common port of passive optical splitter 238. A bandpass filter 202 could be deployed in place of the blocking filter 236 without using the band passing port (e.g., port 212 is terminated) which enables the use of a common component for both bandpass filter and blocking filter.

The 1×N optical coupler 238 is configured to split signals carried on a shared medium into signals carried on dedicated media, and to combine signals carried on the dedicated media into a signal carried on the shared medium. Optical coupler 238 may split a signal into two or more copies of the signal (or combine two or more signals into a single signal). Optical coupler 238 is also a passive device that requires no power to operate and can be deployed at a PON node proximate to subscribers or end-users.

Figure 3A:
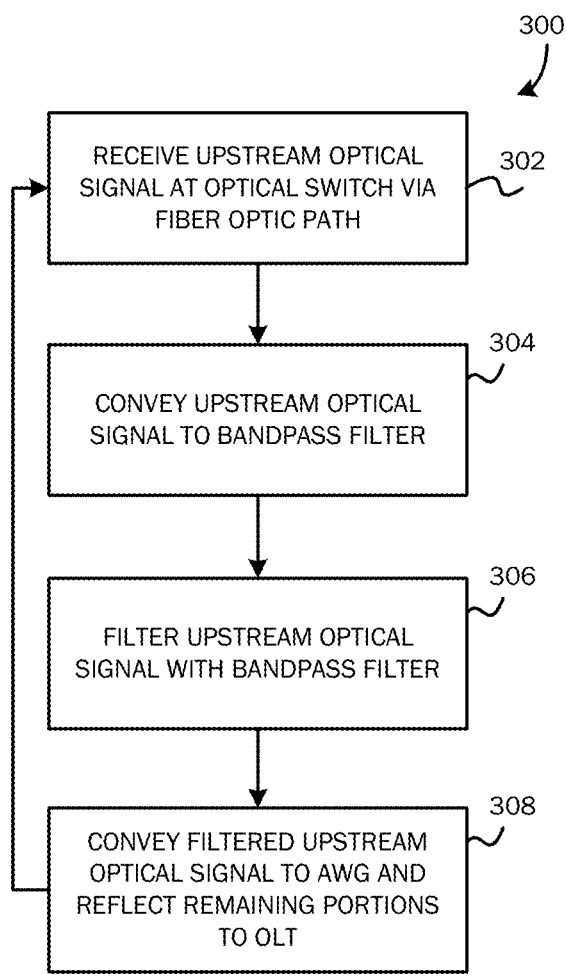
FIG. 3A is a flow diagram that depicts a process of processing an upstream optical signal by the system of FIG. 2.

FIG. 3A is a flow diagram that depicts a process 300 of processing an upstream optical signal by system 200 of FIG. 2, according to an aspect. At 302, the process 300 uses the optical switch 210 to receive an upstream optical signal from one or more field components. For example, the process 300 at 302 receives an upstream optical signal at the optical switch 210 that was conveyed from AWG 246 or ONT 240. At 304, the process 300 uses the optical switch 210 to convey the upstream optical signal to bandpass filter 202. At 306, the process 300 uses the bandpass filter 202 to filter the upstream optical signal. At 308, the process 300 uses the bandpass filter 202 to convey the filtered upstream optical signal (C band and/or L band) to AWG 216 and reflect the unfiltered portions (remaining wavelengths) of the upstream optical signal to OLT 222.

Figure 3B:
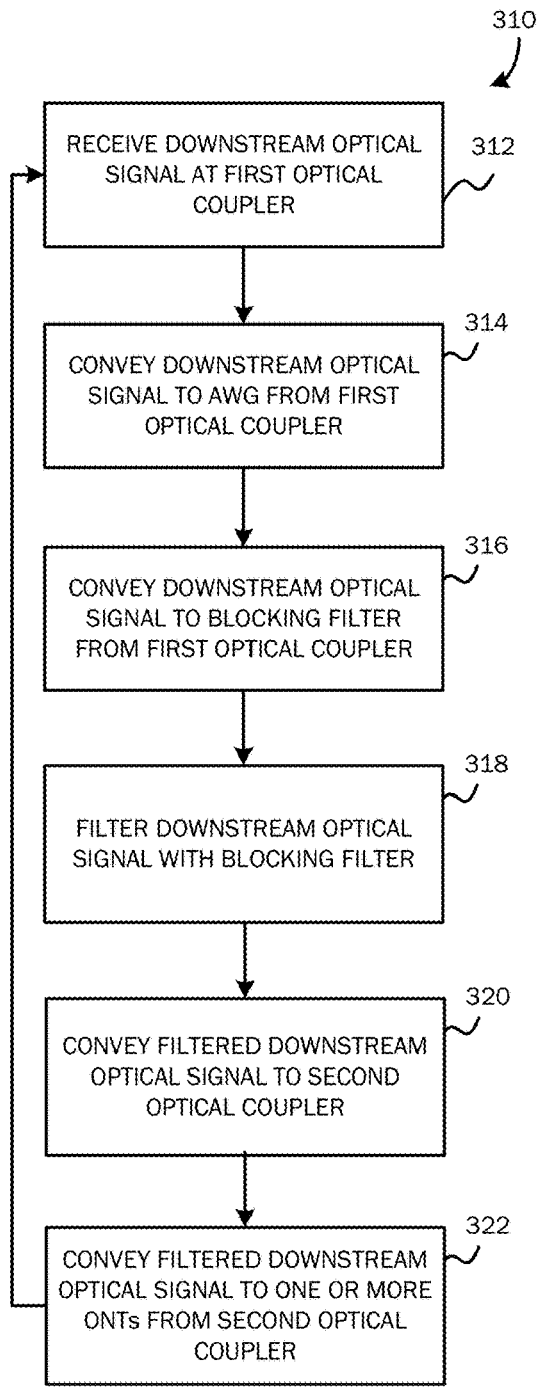
FIG. 3B is a flow diagram that depicts a process of processing a downstream optical signal by the system of FIG. 2.

FIG. 3B is a flow diagram that depicts a process 310 of processing a downstream optical signal by system 200, according to an aspect. At 312, optical coupler 234 is used to receive a downstream optical signal from one or more headend, central office, and/or data center components. For example, the process 310 at 312 uses optical coupler 234 to receive a downstream optical signal conveyed from AWG 216 or OLT 222. At 314, the process 300 uses the optical coupler 234 to convey the downstream optical signal to AWG 246. At 316, the process 300 uses the optical coupler 234 to convey the downstream optical signal to blocking filter 236. At 318, the process 300 uses the blocking filter 236 to filter the downstream optical signal. At 320, the process 300 uses the blocking filter 236 to convey the filtered downstream optical signal to optical coupler 238. At 322, the process 300 uses the optical coupler 238 to convey the filtered PON downstream optical signal to one or more ONTs 240.

Figure 4:
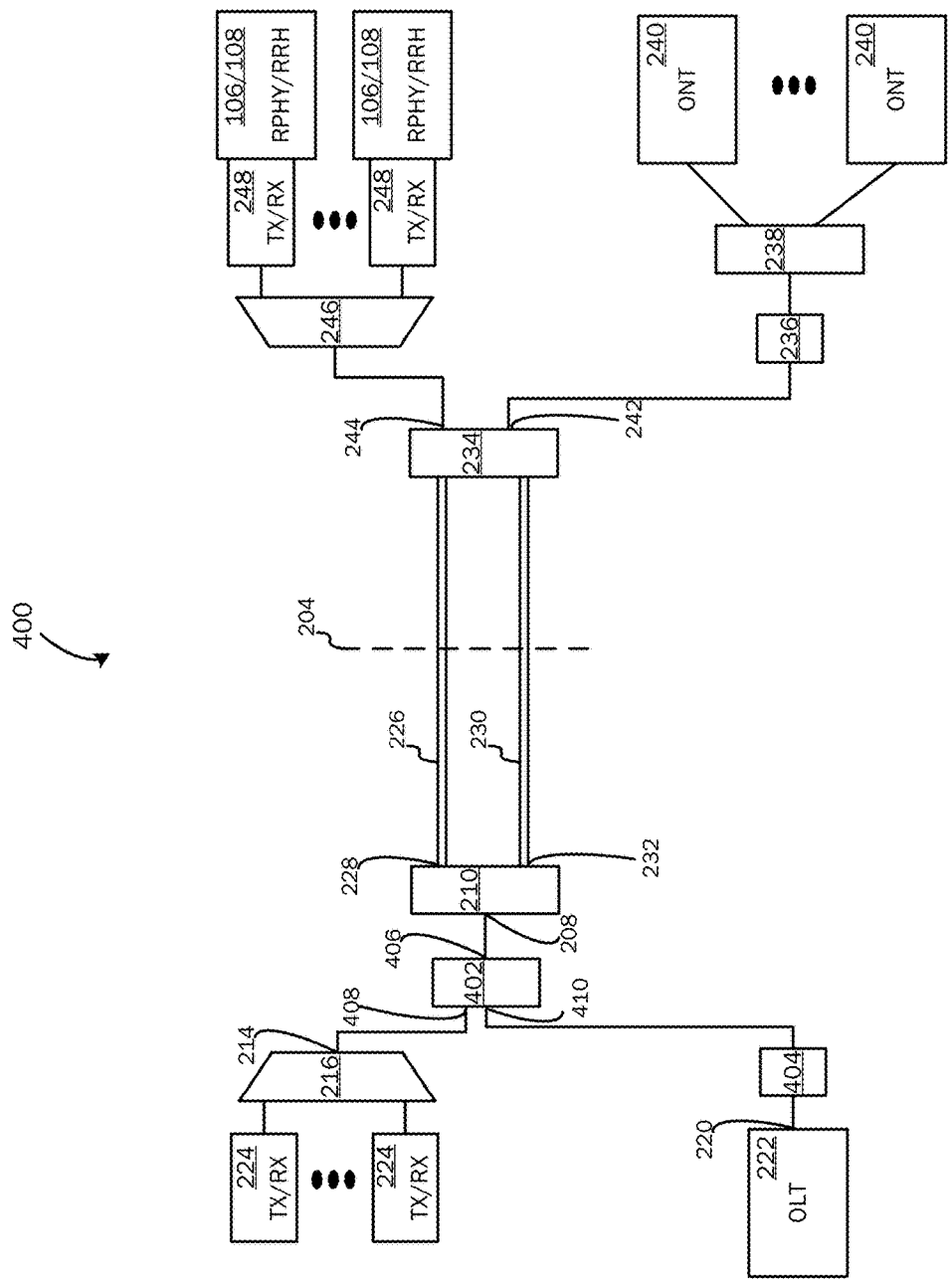
FIG. 4 is a block diagram of a unified system that is based on the topology of FIG. 2.

FIG. 4 is a block diagram of a unified system 400 that is based on the topology of FIG. 2. As shown in FIG. 4, the bandpass filter 202 of FIG. 2 has been replaced with a 1×2 optical splitter 402 and a blocking filter 404. The other components of FIG. 2 are identical and the description can be referred to above. As shown in FIGURE, port 406 of the 1×2 optical splitter 402 is coupled with port 208 of optical switch 210. Port 408 of the 1×2 optical splitter 402 is coupled to port 214 of AWG 216. Port 410 of the 1×2 optical splitter 402 is coupled with the blocking filter 404 which is coupled between OLT 222 and the 1×2 optical splitter 402.

The blocking filter 404 is configured with a stopband to block upstream C band and/or L band optical signals (or some portion thereof) from entering the OLT 222. As described above, since AWG 216 uses different operational frequencies as compared with OLT 222, AWG 216 naturally rejects optical signals having frequencies that do not fall within its frequency spectrum. The link loss associated with DWDM infrastructure of FIG. 4 is a little higher than the link loss associated with DWDM infrastructure of FIG. 2 (about 2 dB). The link loss associated with PON infrastructure of FIG. 4 is a little higher than the link loss associated with PON infrastructure of FIG. 2 (about 3 dB).

Figure 5:
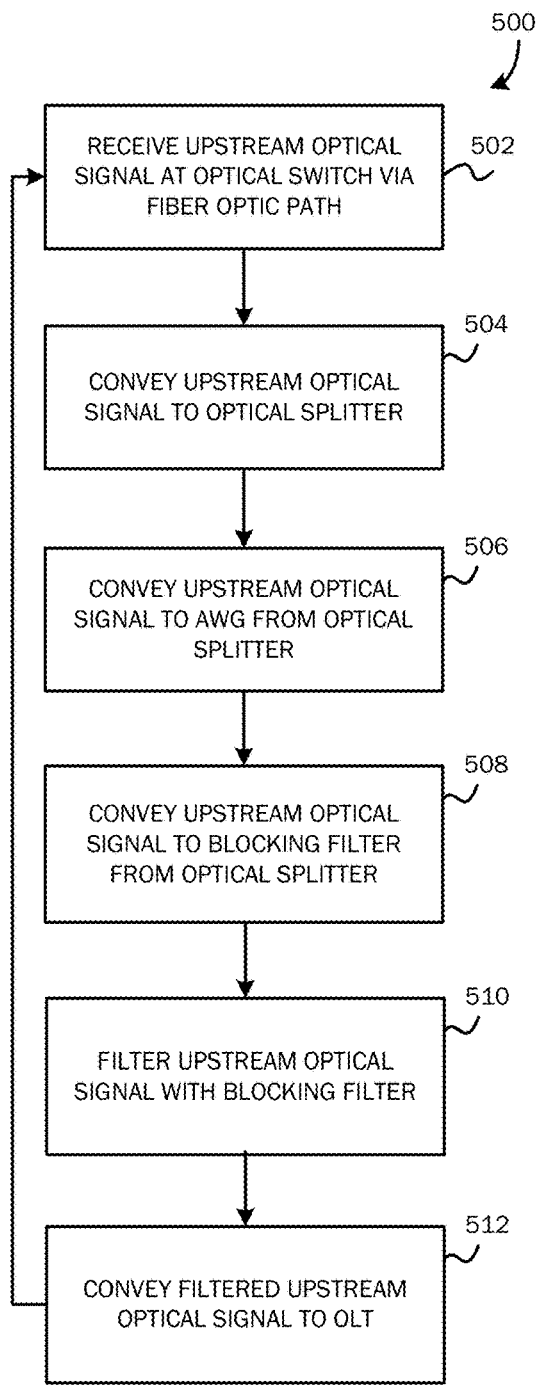
FIG. 5 is a flow diagram that depicts a process of processing an upstream optical signal by the system of FIG. 4.

FIG. 5 is a flow diagram that depicts a process 500 of processing an upstream optical signal by system 400, according to an aspect. At 502, the process 500 uses the optical switch 210 to receive an upstream optical signal from one or more field components. At 504, the process 500 uses the optical switch 210 to convey the upstream optical signal to optical splitter 402. At 506, the process 500 uses the optical splitter 402 to convey the upstream optical signal to AWG 216. At 508, the process 500 uses the optical splitter 402 to convey the upstream optical signal to blocking filter 404. At 510, the process 500 uses the blocking filter 404 to filter the upstream optical signal. At 512, the process 500 uses the blocking filter 404 to convey the filtered upstream optical signal to OLT 222. It will be appreciated that system 400 can use process 310 to process downstream optical signals.

Examples and aspects are described above with reference to block diagrams or operational illustrations of methods, systems, devices, etc. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

What is claimed is:

1. A system to couple a passive optical network (PON) type infrastructure with a dense wavelength division multiplexing (DWDM) network infrastructure, comprising:
    a bandpass filter having a first coupling, a second coupling, and a third coupling, wherein the first coupling of the bandpass filter is coupled to a first arrayed wave grating (AWG) and the second coupling of the bandpass filter is coupled to an optical line terminal (OLT);
    an optical switch coupled to the third coupling of the bandpass filter; and
    a 2×2 optical coupler coupled with the optical switch to provide an optical working path and an optical protection path, wherein first and second couplings of the 2×2 optical coupler are coupled to couplings of the optical switch, a third coupling of the 2×2 optical coupler is coupled to a second AWG, and a fourth coupling of the 2×2 optical coupler is coupled to a stopband filter.

2. The system of claim 1, wherein the bandpass filter:
    filters an upstream optical signal to provide a filtered upstream optical signal;
    conveys unfiltered portions of the upstream optical signal to the OLT; and
    conveys the filtered upstream optical signal to the first AWG.

3. The system of claim 1, wherein the bandpass filter includes a passband to pass C band and/or L band signals to the first AWG.

4. The system of claim 3, wherein the bandpass filter includes a stopband that excludes frequencies used by a Next-Generation Passive Optical Network 2 (NG-PON2).

5. The system of claim 1, further comprising, in place of the bandpass filter: an optical splitter coupled with the first AWG, and the optical switch; and a blocking filter coupled with and positioned between the optical splitter and the OLT, the blocking filter to block C band frequency signals to the OLT.

6. The system of claim 1, wherein the stopband filter is coupled with and positioned between the 2×2 optical coupler and a 1×N optical coupler.

7. The system of claim 6, wherein the 1×N optical coupler is coupled with a plurality of optical network terminals (ONTs).

8. The system of claim 7, wherein the stopband filter blocks optical signals having C band and/or L band wavelengths from reaching the plurality of ONTs.

9. The system of claim 1, wherein the 2×2 optical coupler is coupled with the second AWG which is coupled to one or more of a remote physical (PHY) device and a remote radio head (RRH).

10. The system of claim 1 to support optical communication topologies selected from: GPON, XGS-PON, NG-PON2, 10G EPON, and 25 Gbps/100 Gbps EPON with fifth generation (5G) wireless infrastructure.

11. The system of claim 10, wherein the bandpass filter couples a type of PON with a DWDM fronthaul/backhaul network.

12. The system of claim 1, operable to:
sense an upstream loss of signal (LOS) in a fiber of the optical working path; and
switch communications to a fiber of the optical protection path.

13. A method of coupling a PON with a DWDM network infrastructure, comprising:
deploying a bandpass filter having a first coupling, a second coupling, and a third coupling, wherein:
the first coupling of the bandpass filter is coupled to a first arrayed wave grating (AWG);
the second coupling of the bandpass filter is coupled to an optical line terminal (OLT);
the third coupling of the bandpass filter is coupled to an optical switch; and
deploying a 2×2 optical coupler coupled with the optical switch to provide an optical working path and an optical protection path, wherein first and second couplings of the 2×2 optical coupler are coupled to couplings of the optical switch, a third coupling of the 2×2 optical coupler is coupled to a second AWG, and a fourth coupling of the 2×2 optical coupler is coupled to a stopband filter;
receiving, at the first coupling of the bandpass filter, an upstream optical signal from one or more field components;
filtering the upstream optical signal with the bandpass filter to provide a filtered upstream optical signal; and
conveying unfiltered portions of the upstream optical signal to the OLT via the second coupling of the bandpass filter and conveying the filtered upstream optical signal to the first AWG via the third coupling of the bandpass filter.

14. The method of claim 13, further comprising using the bandpass filter to pass optical signals having C band and/or L band wavelengths to the first AWG.

15. The method of claim 13, further comprising using the bandpass filter to reflect optical signals not having C band and/or L band wavelengths to the OLT.

16. The method of claim 13, further comprising:
sensing an upstream loss of signal (LOS) in a working fiber path; and
switching communications to a protecting fiber path.

17. The method of claim 16, further comprising using the stopband filter to block downstream optical signals having C band and/or L band wavelengths from one or more ONTs.

18. The method of claim 13, further comprising backhauling and/or fronthauling one or more communications from one or more of a remote PHY device, a RRH, or another communication device.

19. A fiber optic network comprising:
passive optical network (PON) components including an optical line terminal (OLT) and an optical network terminal (ONT);
dense wavelength division multiplexing (DWDM) components including a pair of arrayed wave gratings (AWGs);
a bandpass filter having a first coupling coupled to a first AWG of the pair and a second coupling coupled to the OLT,
an optical switch coupled to a third coupling of the bandpass filter; and
a 2×2 optical coupler coupled with the optical switch to provide an optical working path and an optical protection path, wherein first and second couplings of the 2×2 optical coupler are coupled to couplings of the optical switch, a third coupling of the 2×2 optical coupler is coupled to a second AWG of the pair, and a fourth coupling of the 2×2 optical coupler is coupled to a stopband filter, wherein the bandpass filter:
filters an upstream optical signal received via a third coupling to provide a filtered upstream optical signal; and
conveys unfiltered portions of the upstream optical signal to the OLT via the second coupling and conveys the filtered upstream optical signal to the first AWG via the first coupling.

20. The fiber optic network of claim 19, further comprising, in place of the bandpass filter: an optical splitter coupled with the first AWG, and the optical switch; and a blocking filter coupled with and positioned between the optical splitter and the OLT, the blocking filter to block C band frequency signals to the OLT.

* * * * *